United States Patent
Haddad et al.

(10) Patent No.: US 12,515,975 B2
(45) Date of Patent: Jan. 6, 2026

(54) PROCESS FOR ANAEROBIC DIGESTION OF CARBONACEOUS MATERIAL

(71) Applicant: Suez International, Paris la Defense (FR)

(72) Inventors: Mathieu Haddad, Paris la Defense (FR); Pierre-Emmanuel Pardo, Paris la Defense (FR)

(73) Assignee: SUEZ INTERNATIONAL, Paris la Defense (FR)

( * ) Notice: Subject to any disclaimer, the term of this patent is extended or adjusted under 35 U.S.C. 154(b) by 456 days.

(21) Appl. No.: 18/153,130

(22) Filed: Jan. 11, 2023

(65) Prior Publication Data
US 2024/0228354 A1   Jul. 11, 2024

(51) Int. Cl.
*C02F 11/04* (2006.01)
*C02F 1/02* (2023.01)
(Continued)

(52) U.S. Cl.
CPC ............ *C02F 11/04* (2013.01); *C02F 11/10* (2013.01); *C02F 1/025* (2013.01); *C02F 1/16* (2013.01);
(Continued)

(58) Field of Classification Search
CPC .......... C02F 11/04; C02F 11/10; C02F 1/025; C02F 1/16; C02F 1/20; C02F 11/13; C02F 11/185; C02F 11/20; C02F 2203/006; C02F 2209/02; C02F 2301/106; C02F 2303/02; C02F 2303/10; C02F 2303/12; C02F 2303/22
(Continued)

(56) References Cited

U.S. PATENT DOCUMENTS

| 3,219,579 A | * | 11/1965 | Kranz | ........................ | C02F 1/02 210/600 |
| 6,942,798 B2 | * | 9/2005 | Miller, III | ................ | C02F 3/28 210/603 |

(Continued)

FOREIGN PATENT DOCUMENTS

| CN | 212246721 U | 12/2020 |
| DK | 3008193 T3 | 9/2018 |

(Continued)

OTHER PUBLICATIONS

International Search Report and the Written of the International Searching Authority as issued in International Patent Application No. PCT/EP2024/050459, dated Feb. 26, 2024.
Barber, W. P. F., "Thermal hydrolysis for sewage treatment: a critical review." Water Research 104 (Year: 2016): 53-71.
(Continued)

*Primary Examiner* — Fred Prince
(74) *Attorney, Agent, or Firm* — Pillsbury Winthrop Shaw Pittman LLP

(57) ABSTRACT

A process of treatment of carbonaceous material, such as wastewater sludge or organic waste, includes performing a thermal treatment of the carbonaceous material, thereby providing thermally treated carbonaceous material, cooling the thermally treated carbonaceous material, thereby providing cooled carbonaceous material, the cooling being performed using a vacuum cooling procedure, and performing a post-treatment of the cooled carbonaceous material, and at least one carbonaceous material degassing.

28 Claims, 6 Drawing Sheets

(51) Int. Cl.
- C02F 1/16 (2023.01)
- C02F 1/20 (2023.01)
- C02F 11/10 (2006.01)
- C02F 11/13 (2019.01)
- C02F 11/18 (2006.01)
- C02F 11/20 (2006.01)

(52) U.S. Cl.
CPC ............... C02F 1/20 (2013.01); C02F 11/13 (2019.01); C02F 11/185 (2013.01); C02F 11/20 (2013.01); C02F 2203/006 (2013.01); C02F 2209/02 (2013.01); C02F 2301/106 (2013.01); C02F 2303/02 (2013.01); C02F 2303/10 (2013.01); C02F 2303/12 (2013.01); C02F 2303/22 (2013.01)

(58) Field of Classification Search
USPC ....... 210/605, 612, 613, 175, 188, 252, 259, 210/903
See application file for complete search history.

(56) References Cited

U.S. PATENT DOCUMENTS

| | | | |
|---|---|---|---|
| 2014/0305865 | A1 | 10/2014 | Dimassimo et al. |
| 2019/0106347 | A1 | 4/2019 | Wanstrom et al. |

FOREIGN PATENT DOCUMENTS

| | | | |
|---|---|---|---|
| ES | 2430739 | A1 | 11/2013 |
| JP | S58-61900 | A | 4/1983 |
| KR | 10-0588166 | B1 | 6/2006 |
| WO | WO 2021/018780 | A1 | 2/2021 |

OTHER PUBLICATIONS

Sandino, J., et al. "Thermal Hydrolysis and Incineration of Sludge: Evaluating Their Role Optimizing Energy Profiles at Advanced BNR Facilities." Proceedings of the Water Environment Federation 2018.18 (Year: 2018): 372-386.

Gonzalez, A., et al., "Pre-treatments to enhance the biodegradability of waste activated sludge: elucidating the rate limiting step." Biotechnology advances 36.5 (Year: 2018): 1434-1469.

Examples of Equivalent Processes: PFRP and PSRP, United States Environmental Protection Agency, Retrieved from the Internet: URL: https://www.epa.gov/biosolids/examples-equivalent-processes-pfrp-and-psrp, Retrieved on Jan. 10, 2023.

Huyard, A., et al., "The two-phase anaerobic digestion process: sludge stabilization and pathogens reduction." Water Science and Technology 42.9 (Year: 2000): 41-47.

Willis, J., et al., "Advances in thermophilic anaerobic digestion." Proceedings of the Water Environment Federation Jul. 2006 (Year: 2006): 5378-5392.

Ge, H., et al., "Temperature phased anaerobic digestion increases apparent hydrolysis rate for waste activated sludge." Water Research 45.4 (Year: 2011): 1597-1606.

Ge, H., et al., "Increased temperature in the thermophilic stage in temperature phased anaerobic digestion (TPAD) improves degradability of waste activated sludge." Journal of Hazardous Materials 187.1-3 (Year: 2011): 355-361.

Ge, H., et al., "Pre-treatment mechanisms during thermophilic-mesophilic temperature phased anaerobic digestion of primary sludge." Water research 44.1 (Year: 2010): 123-130.

Watts, S., et al., "Two-stage thermophilic-mesophilic anaerobic digestion of waste activated sludge from a biological nutrient removal plant." Water science and technology 53.8 (Year: 2006): 149-157.

Akgul, D., et al., "Temperature phased anaerobic digestion of municipal sewage sludge: a Bardenpho treatment plant study." Water Practice and Technology 11.3 (Year: 2016): 569-573.

* cited by examiner

[Fig. 1]
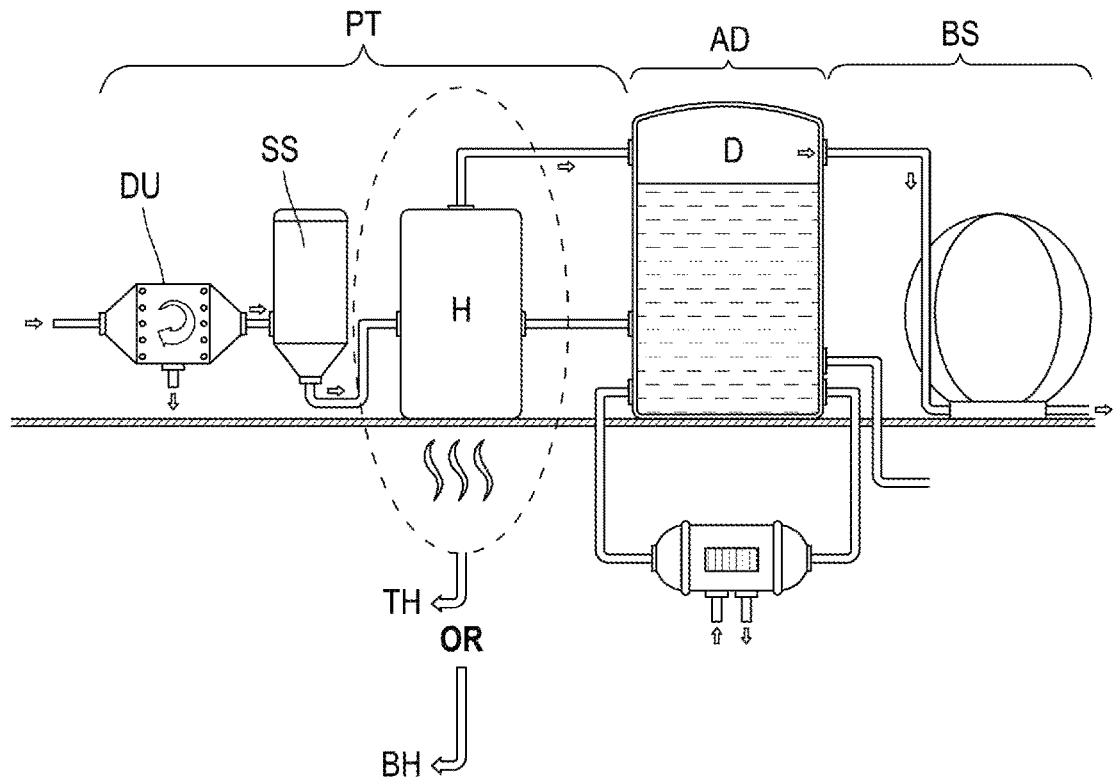
[Fig. 2]
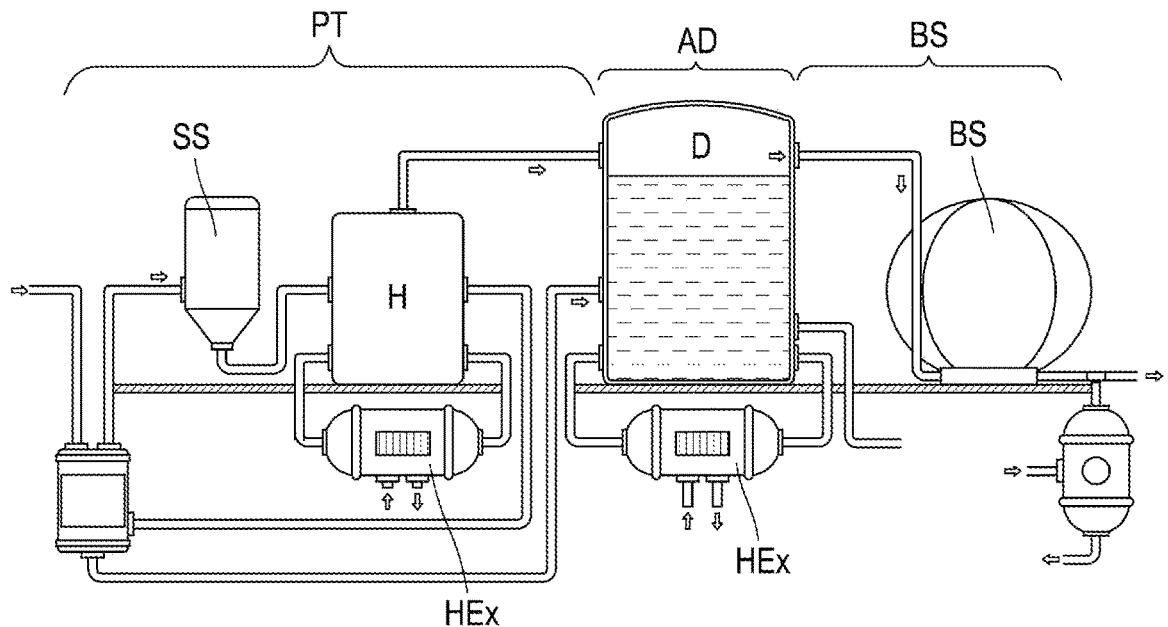

[Fig. 3]
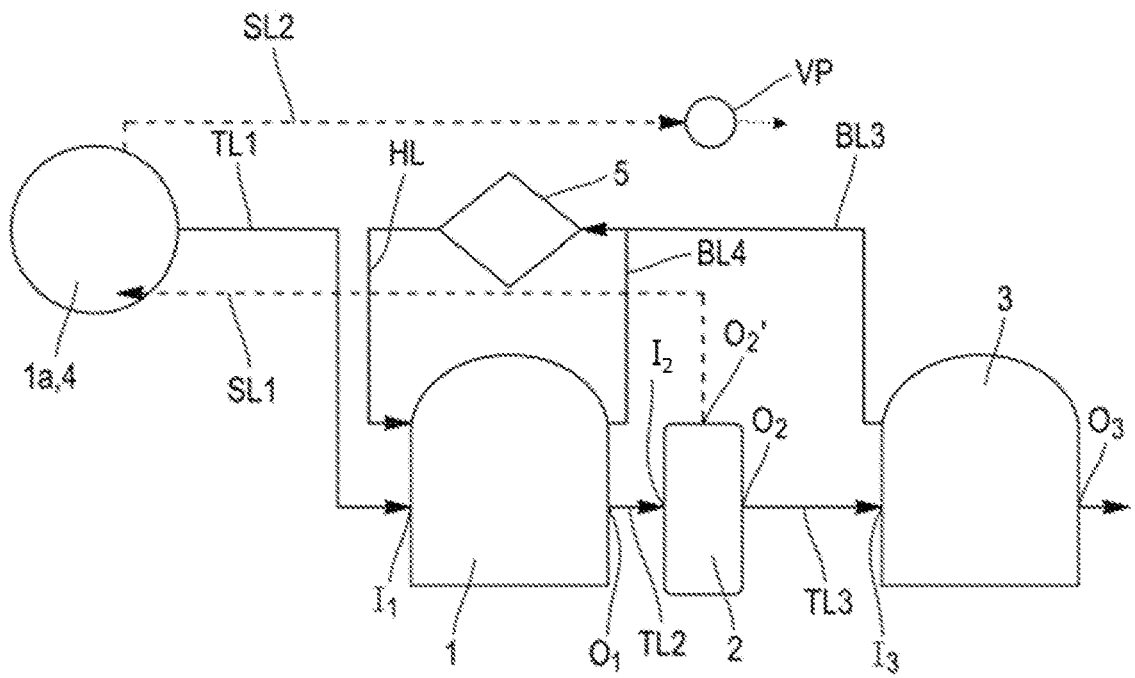
[Fig. 4]
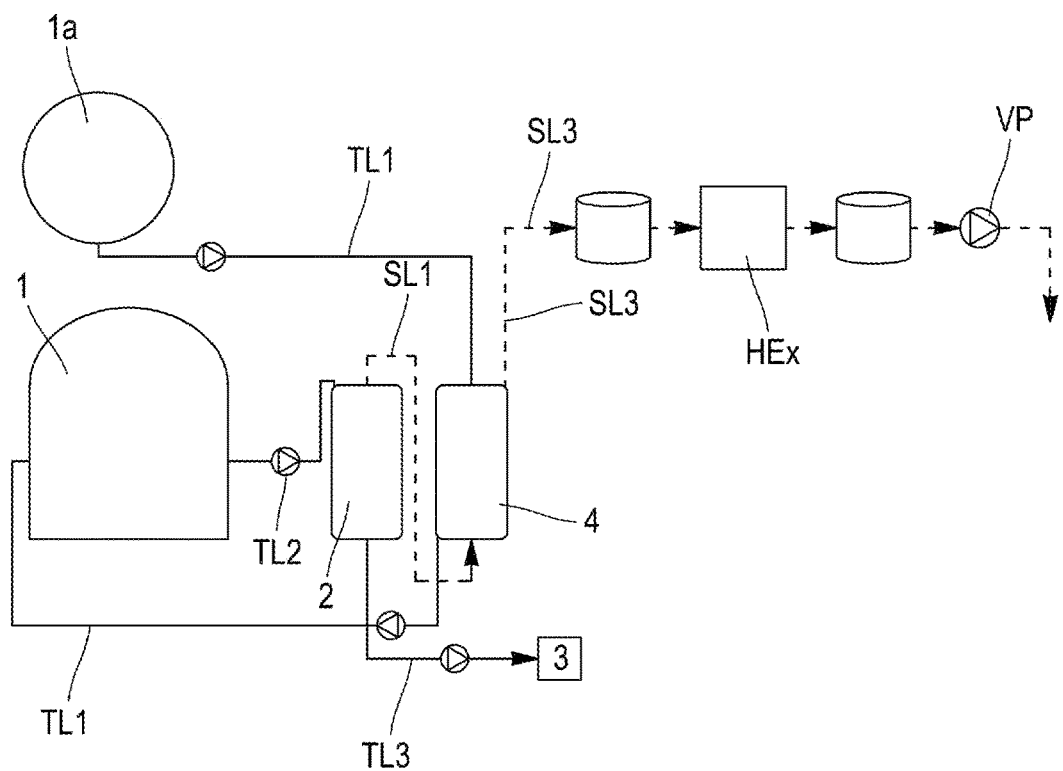

[Fig. 5]
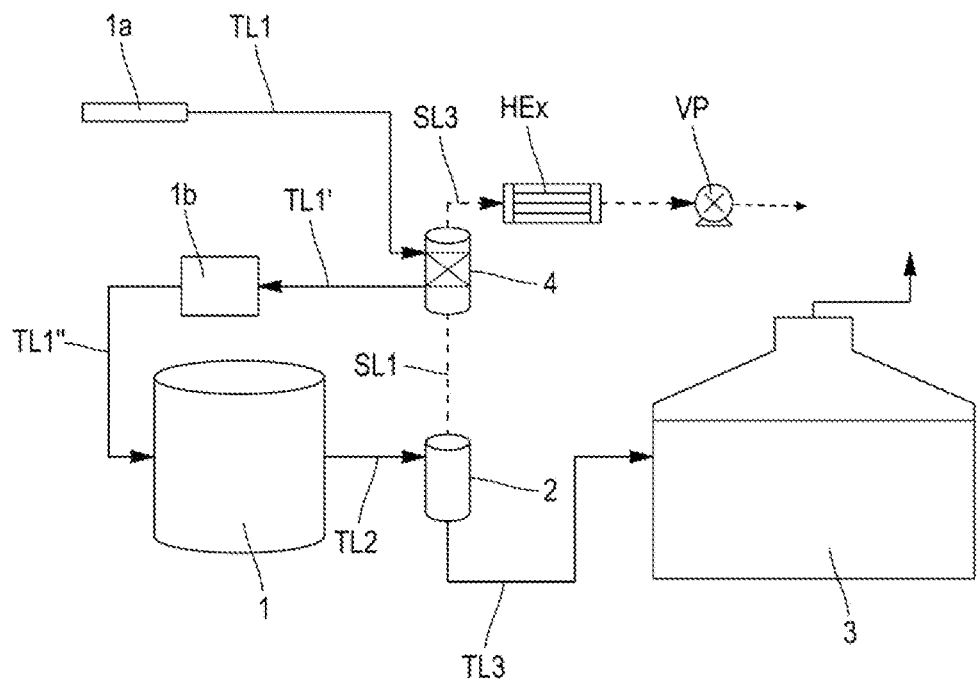
[Fig. 6]
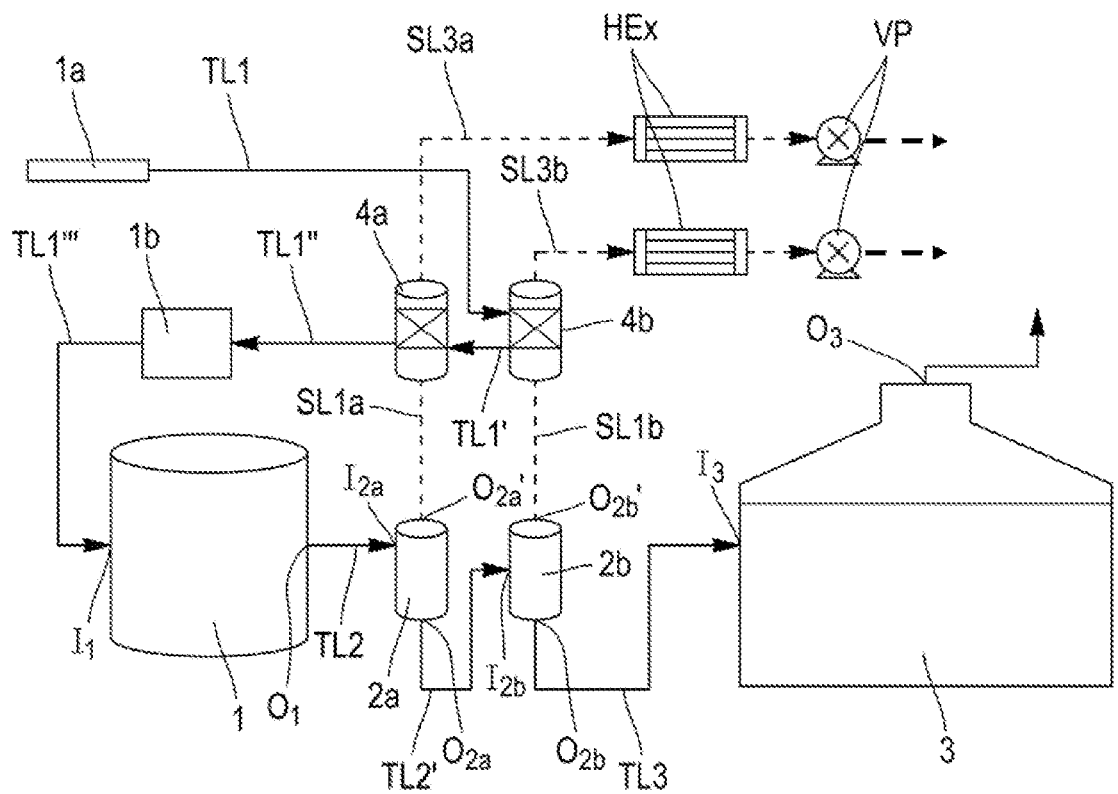

[Fig. 7]
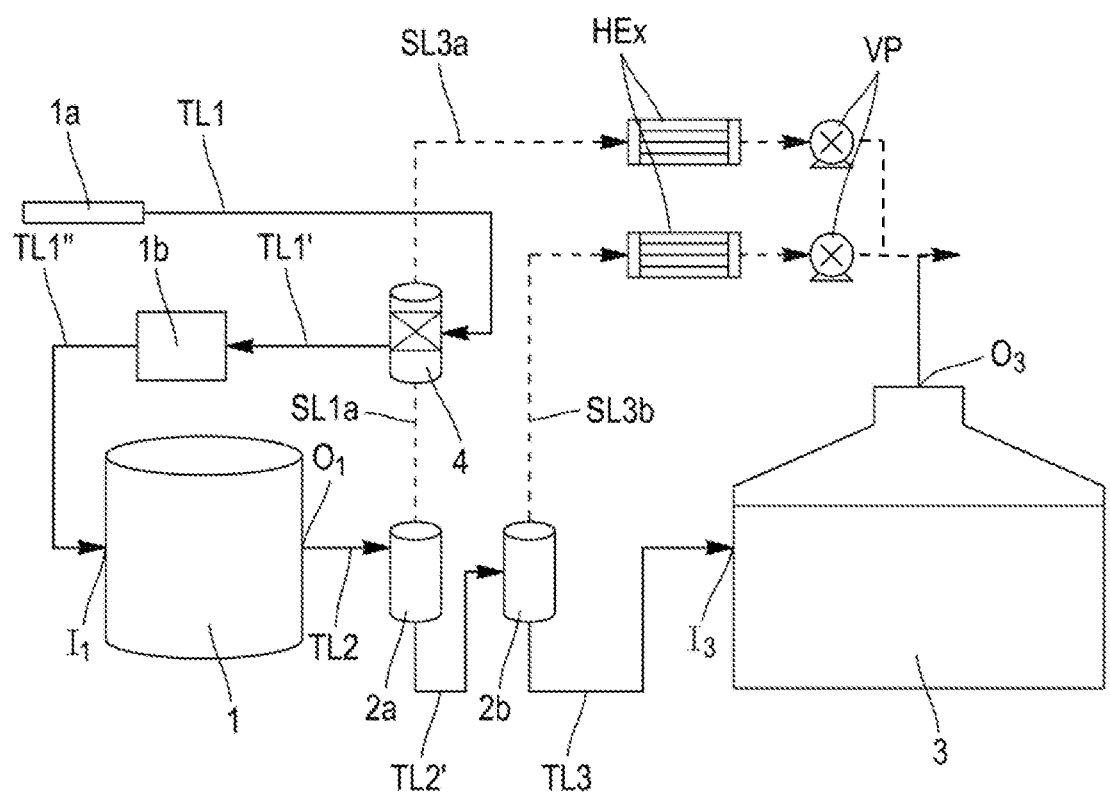

[Fig. 8]
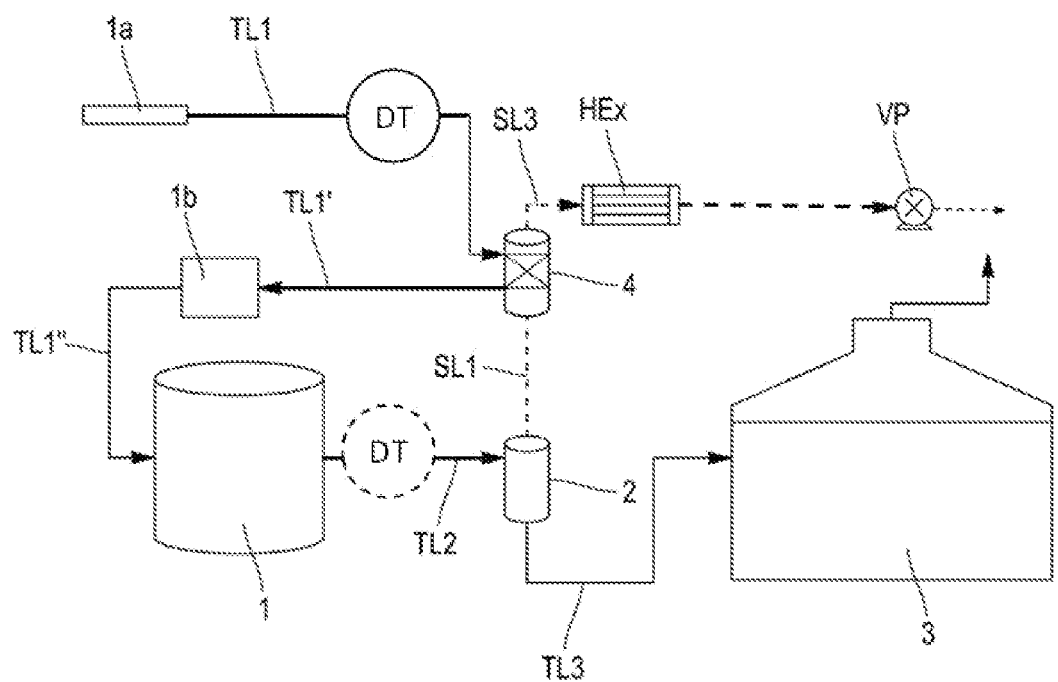

[Fig. 9]
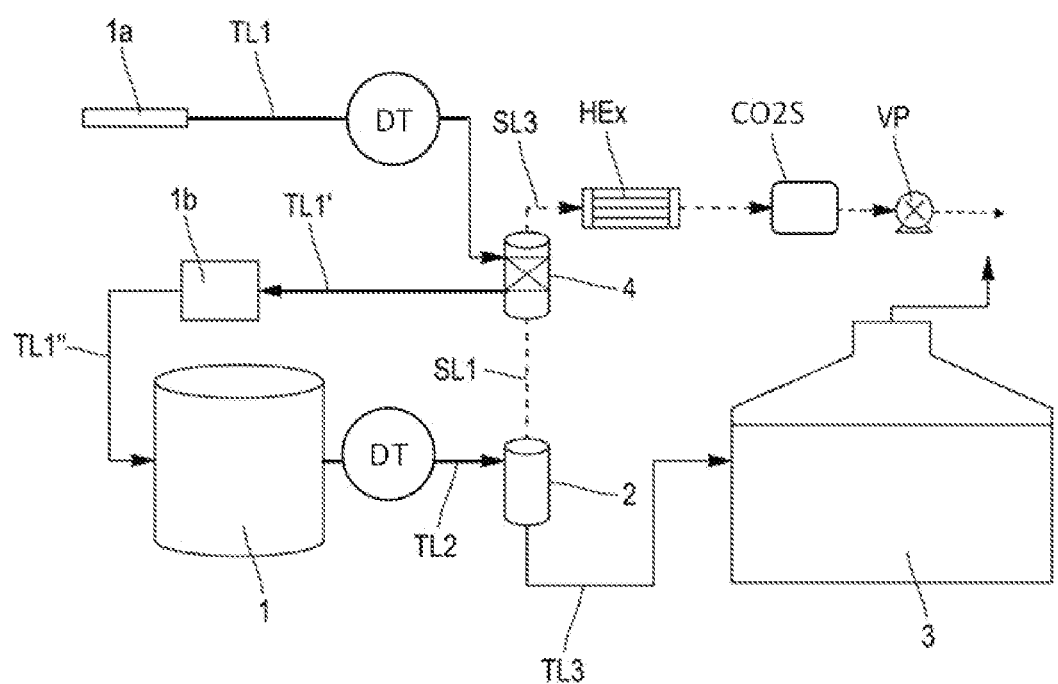

PROCESS FOR ANAEROBIC DIGESTION OF CARBONACEOUS MATERIAL

FIELD

The present invention relates to carbonaceous materials treatment comprising a thermal pre-treatment step. More specifically, it concerns a sludge or organic waste treatment including at least one biological treatment step such as anaerobic digestion.

BACKGROUND

Anaerobic digestion is a key process to recover the energy initially present in carbonaceous material, such as wastewater and organic waste, in the form of biogas. The improvement in digestion efficiency leads to increased energy production on the road to the energetically self-sufficient WWTP (wastewater treatment plant) and waste treatment facilities. However, anaerobic digestion shows certain limitations in the first hydrolytic step, leading to slow degradation of the organic matter and high retention times in the digester. To improve the kinetics of anaerobic biodegradation, many pre-treatment technologies have been developed with the aim of accelerating the hydrolysis limiting step and enhancing biogas productivity, as well as the characteristics of the digested carbonaceous material (or sludge).

A state-of-the-art improved digestion process, with different examples of hydrolysis pre-treatment steps implemented upstream a mesophilic digester, is displayed in FIG. 1. The hydrolysis pre-treatment step (PT) may either be a thermal hydrolysis (TH) or a biological hydrolysis (BH), performed in a tank (H). The pre-treatment step may also comprise a pre-dewatering step (performed in a pre-dewatering unit DU) and storing the carbonaceous material in a storage unit (SS), wherein the carbonaceous material is pre-treated before entering the thermal treatment reactor (H).

Thermal hydrolysis (TH or THP) is the most widespread pre-treatment technology used to enhance sludge anaerobic digestion (AD) in WWTP. Thermal hydrolysis has the objective of improving digestion performances and dewaterability on biological or mixed sludge by breaking down bacteria's cellular walls; cell content consequently becoming easily degradable anaerobically.

Another method used to enhance the rate limiting hydrolysis step is based on biological hydrolysis (BH) also known as Temperature Phased Anaerobic Digestion (TPAD or 2PAD). TPAD typically combines a short (1-3 days) thermophilic pre-treatment stage (typically 50 to 70° C. or 75° C.) applied prior to a conventional mesophilic anaerobic digestion (typically 35° C. to 38° C., 10-20 days). The TPAD is usually fed with a carbonaceous material exhibiting a dry solid (DS) content ranging from 3 to 8% DS. It combines a short thermophilic pre-treatment stage applied prior to a conventional mesophilic anaerobic digestion. Thermophilic-mesophilic TPAD or 2PAD has been shown to be an effective treatment for increasing methane production and volatile solids (VS) destruction, compared with a single-stage mesophilic digestion.

As compared with thermal hydrolysis, biological hydrolysis shows inferior performances in terms of sludge dewaterability and digestion performance (biogas production, the produced biogas being stored in a biogas storage BS). However, biological hydrolysis is an interesting alternative because it requires lower capital expenditures, and is, in particular, more relevant in emerging countries.

The TPAD allows for the production of US EPA class B biosolids whereas the 2PAD allows for the production of class A biosolids.

The beneficial reuse of biosolids through land application is governed in the United States (US) by the Environmental Protection Agency (EPA), more specifically through the EPA's CFR 40 Part 503 rule for biosolids. Within the part 503 rule, definition of quality of Biosolids is defined and have two commonly identified terminologies: Class A Biosolids; and Class B Biosolids. While the part 503 rule also defines, quality surrounding such things as heavy metals, the focus of AD processes and digestion enhancements are focused on meeting the requirements surrounding pathogen and vector attraction reductions.

In a TPAD/2PAD system, the sludge has to be cooled between the (thermophilic) biological hydrolysis reactor (ca. 55° C.) H and the mesophilic digester D, usually at 37° C. Today, downstream the hydrolysis step of a TPAD, sludge cooling occurs via heat exchangers (recovery heat exchangers or water/sludge, further designated as HEx) as displayed in FIG. 2.

The water used in HEx is, typically, the process water of the wastewater treatment plant.

The heat exchanger size can become significantly large as it depends on the temperature of the process water. Indeed, the sizing of the HEx depends on the delta temperature in the heat exchanger between the cold side (cooling water) and the hot side (hydrolysed sludge). The smaller the delta temperature, the larger the HEx.

Multiple limitations of the current configurations are found with the current HEx.

Viscosity varies significantly depending on the type of sludge, and from one site to another, which can heavily impact the size of the heat exchanger (heat exchange coefficient variability) and induce significant energy cost for pumping (important head losses). This can render the heat recovery HEx uneconomical or even unfeasible. This also limits the scalability of the process from one site to another.

Many emerging countries are found in tropical or warm climate regions where the process water temperature (used for cooling) can be too hot to efficiently cool down the sludge (temperature of process water often being superior to 20° C.). This significantly increases the HEx size, in which the generated head loss requires using large pumping capacity and size and consequently renders the solution energy intensive and/or uneconomical. This is not compatible with the requirement to reduce energy consumption in countries where energy costs are high.

This is the reason why very few actors on the market offer a TPAD/2PAD on large industrial installations, where the HEx size issues become unmanageable.

Lastly, deposits that occur in the heat exchanger can also diminish the quality of the exchange as they reduce the heat exchange coefficient.

In order to overcome the above-mentioned limitations, heat exchangers designs include numerous safety margins to ensure proper operations. Consequently, cooling heat exchangers can be very lengthy. The longer the heat exchanger, the bigger the head loss, and with it the electrical consumption of the pumps.

In addition, the heat exchanger should be maintained and kept clear of fouling (grease, solids and mineral deposits may occur). The latter continuously decrease the global heat exchange to a value below the one desired, in addition to increasing the head losses of the pump.

And as the TPAD may be operated in batch, in which case it is named 2PAD, the heat exchanger may be used only a fraction of the day, with no flow going through it. During these batch phases, significant deposits may occur and permanently stick to the HEx walls, which further accelerates future deposits.

Another difficulty of TPAD/2PAD current processes is the preheating step of the sludge prior to be fed to the biological hydrolysis reactor.

In a TPAD/2PAD system, as the first stage (BH) is operated under thermophilic conditions, it needs to be preheated. To reduce the heat requirements of this first stage, it is possible to use the hot hydrolysed sludge to heat up the cold raw sludge feeding the system. This heat recovery is usually carried out in a double heat exchanger hot sludge/water/cold sludge. The water is the energy transfer media that carries the energy from the hot sludge to the cold sludge.

This leads to the need to build another heat exchanger to recover the energy. Another possibility is to have a hot sludge/cold sludge heat exchanger. In this case, the heat exchange coefficient is very limiting, and in terms of overall mass, the mass of this sludge/sludge HEx is equivalent to the one of the sludge/water/sludge HEx and consequently their cost is also in the same range.

The same shortcomings are found in anaerobic digestion processes including a TH pre-treatment step upstream of the anaerobic digestion, or when the carbonaceous material has to be pasteurized prior to being digested.

At last, due to the production of non-condensable gases during the process, the vacuum pumps necessary for the treatment of carbonaceous materiel must be therefore more powerful and more energy consuming than necessary.

SUMMARY

Aspects of the present invention almost eliminate the above-described intermediate HEx drawbacks. The preheating steps drawbacks and additional costs may also be significantly reduced.

An aspect of the present invention is in particular directed towards a process of temperature-phased anaerobic digestion of wastewater sludge, organic waste, or any kind of carbonaceous material, either continuous (TPAD) or batch (2PAD), where the cooling of sludge downstream the biological hydrolysis step is performed using a vacuum cooling step, and wherein at least one step of carbonaceous material degassing is performed.

In a first aspect, the present invention relates to a process for treating carbonaceous material, such as wastewater sludge or organic waste, comprising the steps of:
(1) performing a thermal treatment of the carbonaceous material, thereby providing thermally treated carbonaceous material,
(2) cooling of the thermally treated carbonaceous material, thereby providing cooled carbonaceous material, the cooling being performed using a vacuum cooling step,
(3) performing a post-treatment of the cooled carbonaceous material, and at least one step of carbonaceous material degassing.

Beneficially, the degassing step operates at a vacuum level higher than the corresponding boiling point of the hot and fresh carbonaceous material (sludge or organic waste).

As used herein, a "carbonaceous material" is understood as a mixture of organic and inorganic materials, such as biomass. In the present disclosure, it may also be referred to as "organic matter". The carbonaceous material is typically wet. Its dry solid content is beneficially between 3 and 25%. Examples of carbonaceous material are organic waste and/or sludge, and more particularly sludge from organic waste or drinking water or wastewater treatment plants. Typically, in the present disclosure, the carbonaceous material is a sludge, such as a wastewater treatment sludge. Examples of sludge are municipal sludge, biological sludge, and fresh or raw sludge.

As used herein, a "vacuum cooling" is understood as an evaporation under vacuum, that is to say at a pressure below atmospheric pressure. In general, it refers to a rapid cooling technique for evaporating water from any suspension comprising organic matter, such as sludge or organic waste, the evaporation being performed under vacuum. In some instances, it is referred to as "flash cooling" or "vacuum flash cooling", as the evaporation is almost "instantaneous". Vacuum Cooling is typically operated at an absolute pressure ranging from 0.055 to 0.480 bar (i.e. 5 500 to 48 000 Pa), such as from 0.055 to 0.170 bar (i.e. 5 500 to 17 000 Pa), or from 0.15 to 0.48 bar (i.e. 15 000 to 48 000 Pa).

In the vacuum cooling step, part of the water content of the sludge is evaporated, producing steam at a temperature determined by the absolute pressure in the vacuum cooling vessel, herein referred to as "recovered steam". In the following, it may also be referred to as "flash steam" or simply "steam". Recovered steam is distinguished from "Off-gas" or "non-condensable gas", which are herein understood as gas produced downstream of the cooling unit, not condensed for instance in a subsequent heat recovery step (typically at a temperature of between 50° C. and 80° C., and at a pressure equal or close to the pressure in the vacuum cooling unit/step, i.e. at an absolute pressure ranging from 0.055 to 0.48 bar (i.e. 5 500 to 48 000 Pa)). Off-gas generally comprise or consist essentially of $N_2$ (nitrogen), $H_2S$ (hydrogen sulphide), $CO_2$ (Carbon dioxide), light hydrocarbons (saturated, linear or ramified $C_1$-$C_4$ hydrocarbon chains, in particular methane), and/or $NH_3$ (ammonia).

Beneficially, the thermally-treated carbonaceous material (in particular sludge) is then cooled down (for instance to a temperature around 37° C.) prior to be temporarily stored (typically held in an intermediate holding tank) and/or to be submitted to a post-treatment.

As used herein, the "thermal treatment" of step 1) is understood as comprising heating the carbonaceous material to 50° C. or more, typically between 50° C. and 90° C. Examples of thermal treatment comprise low temperature thermal hydrolysis (TH), biological hydrolysis (BH, corresponding to the first step of a temperature-phased anaerobic digestion), thermophilic anaerobic digestion, or pasteurization.

"Pasteurization" is well-known in the art. It is usually understood as a process in which a liquid product is treated with mild heat, usually at a temperature of less than 100° C., beneficially between 70° C. and 75° C., to eliminate pathogens.

Anaerobic digestion is a process involving microorganisms that break down carbonaceous material in the absence of oxygen. This process produces a digestate and a gaseous fraction comprising methane, and typically consisting essentially of methane and $CO_2$, also called biogas. Anaerobic digestion is usually performed at pH conditions between 7.0 and 7.5, in an embodiment between 7.0 and 7.2.

"Thermophilic anaerobic digestion" is well-known in the art. It is an anaerobic digestion typically performed at a temperature of between 50° C. and 60° C.

"Low temperature thermal hydrolysis", abbreviated as "TH", is well known in the art. As used herein, it is understood as a process aiming at improving digestion performances and dewaterability on carbonaceous material (typically biological or mixed sludge) by breaking down bacteria's cellular walls; cell content consequently becoming easily degradable anaerobically.

A typical prior art TH process is depicted in FIG. 1. In this process, carbonaceous material—usually sludge, for example with a dry solid (DS) content ranging from 12 to 22%—is heated to a temperature of between 140 and 165° C., typically for 30 minutes. The hydrolysed sludge is then cooled down in a flash tank before being fed to the digester D wherein the anaerobic digestion is performed. Following hydrolysis, sludge is typically diluted to approximately 10% dry matter content before being injected into the digester: Mixing is effective despite this high concentration as thermal hydrolysis decreases sludge viscosity. The produced biogas is recovered in a tank T.

The following publications disclose further TH processes:

Barber, W. P. F. "Thermal hydrolysis for sewage treatment: a critical review." Water Research 104 (2016): 53-71.

Sandino, Julian, et al. "Thermal Hydrolysis and Incineration of Sludge: Evaluating Their Role in Optimizing Energy Profiles at Advanced BNR Facilities." Proceedings of the Water Environment Federation 2018.18 (2018): 372-386.

Gonzalez, A., et al. "Pre-treatments to enhance the biodegradability of waste activated sludge: elucidating the rate limiting step." Biotechnology advances 36.5 (2018): 1434-1469.

"Biological hydrolysis" (BH) is well known in the art. As used herein, it is the first step of Temperature Phased Anaerobic Digestion (TPAD or 2PAD). Typically, BH is a thermophilic digestion step, beneficially operated at a temperature of between 50° C. et 75° C. (while the second step of a TPAD/2PAD is usually a mesophilic digestion operated at a temperature of between 30-40° C., beneficially between 35° C. and 38° C.). Prior art TPAD/2PAD including a BH step are for instance described in ES2430739, DK3008193 and KR100588166B1.

Descriptions of state-of-the-art TPAD/2PAD processes can also be found in the following publications:

https://www.epa.gov/biosolids/examples-equivalent-processes-pfrp-and-psrp (search 2PAD)

Huyard, A., B. Ferran, and J-M. Audic. "The two-phase anaerobic digestion process: sludge stabilization and pathogens reduction." Water Science and Technology 42.9 (2000): 41-47.

Willis, John, and Perry Schafer. "Advances in thermophilic anaerobic digestion." Proceedings of the Water Environment Federation 2006.7 (2006): 5378-5392.

Ge, Huoqing, Paul D. Jensen, and Damien J. Batstone. "Temperature phased anaerobic digestion increases apparent hydrolysis rate for waste activated sludge." Water Research 45.4 (2011): 1597-1606.

Ge, Huoqing, Paul D. Jensen, and Damien J. Batstone. "Increased temperature in the thermophilic stage in temperature phased anaerobic digestion (TPAD) improves degradability of waste activated sludge." Journal of Hazardous Materials 187.1-3 (2011): 355-361.

Ge, Huoqing, Paul D. Jensen, and Damien J. Batstone. "Pre-treatment mechanisms during thermophilic-mesophilic temperature phased anaerobic digestion of primary sludge." Water research 44.1 (2010): 123-130.

Watts, S., G. Hamilton, and J. Keller. "Two-stage thermophilic-mesophilic anaerobic digestion of waste activated sludge from a biological nutrient removal plant." Water science and technology 53.8 (2006): 149-157.

Akgul, D., M. A. Cella, and C. Eskicioglu. "Temperature phased anaerobic digestion of municipal sewage sludge: a Bardenpho treatment plant study." Water Practice and Technology 11.3 (2016): 569-573.

As used herein, the "post-treatment" of step 3) may comprise or be a mechanical and/or a biological treatment. An example of "mechanical treatment" is a dewatering step. As used herein, a "biological treatment" is understood as a thermophilic acidogenesis, an aerobic digestion, an anaerobic digestion, or a fermentation.

"Fermentation" is a process well-known in the art and may be defined as a biological anaerobic process extracting energy from carbohydrates in the absence of oxygen, to produce small molecules (organic substrates), in particular RBCs, through the action of enzymes in particular. No $CH_4$ is produced, or only traces amounts. There are five main types of fermentation:

Alcoholic Fermentation, yielding mainly ethanol,
Lactic Acid Fermentation, yielding lactate,
Propionic Acid Fermentation, yielding propionate,
Butyric Acid/Butanol Fermentation, yielding butyrate and butanol,
Mixed Acid Fermentation, yielding VFAs (mainly acetate, but also propionate, lactate, butyrate).

The fermentation process may be controlled by the retention time of the sludge into the anaerobic tank, temperature and pH in the anaerobic tank, as well as by the specific microbial population involved in the fermentation process (i.e. by the choice of microbial strains in the anaerobic tank).

In an embodiment, the process further comprises a step of pre-heating the carbonaceous material with the recovered steam of step 2).

In an embodiment, pre-heating of the carbonaceous material (such as raw sludge) entering the thermal treatment step 1) is performed by direct contact of the recovered steam produced in the vacuum cooling step 2), with the carbonaceous material. Alternatively, it may be performed by direct injection of the recovered steam produced in the flash cooling step (2), into the carbonaceous material (such as raw sludge).

In another embodiment, the recovered steam of step 2) is directly contacted with the carbonaceous material (raw sludge) upstream the thermal treatment step 1). Accordingly, the carbonaceous material (raw sludge) is directed first to a heat recovery vessel wherein the sludge is in contact with the recovered steam produced in the vacuum cooling step. Then the sludge enters a reactor of a first unit where it is submitted to a thermophilic biological treatment or to a mechanical treatment.

In another embodiment, the process comprises a step of $CO_2$ capturing, upstream of the cooling of step 2). The step of $CO_2$ capturing can be performed on a steam in excess in the heat recovery vessel (4), such as after a step of condensing (HEx) the steam in excess and before a vacuum pump (VP).

In a particular embodiment, the process according to the invention comprises the steps of
(1) Performing a first thermal treatment of wastewater sludge or organic matter or any carbonaceous material, at a temperature T1 between 50 and 90° C., such as between 50° C. and 75° C., thereby producing thermally treated carbonaceous material,
(2) Cooling the resulting thermally treated carbonaceous material downstream of step (1) to a temperature T2 (T2 lower than T1) of between 34-75° C. in a cooling unit (flash cooler) operating under vacuum (operating typically from 0.055 to 0.170 bar (absolute pressure, i.e. 5 500 to 17 000 Pa), thereby producing cooled carbonaceous material, (3) Performing a post-treatment of the cooled carbonaceous material, and (4) at least one step of carbonaceous material degassing.

The thermal treatment of step (1) may be a pasteurization, a thermophilic biological treatment and/or a low temperature thermal hydrolysis.

The post-treatment of step (3) may be any suitable treatment. This post-treatment may be a mechanical treatment like a dewatering process, temporary storage. It may also be an anaerobic treatment, such as a fermentation or an anaerobic digestion. The anaerobic digestion may be a two-stage digestion or a mesophilic digestion In a particular embodiment, the thermal treatment of step (1) is a pasteurization or a low temperature thermal hydrolysis, desirably a pasteurization. In such case, the post treatment beneficially comprises or is an anaerobic treatment, such as a fermentation or an anaerobic digestion. The anaerobic digestion may be a two-stage digestion or a mesophilic digestion.

Step (2) may be performed in one step or in several sub-steps. In other words, the vacuum cooling step may comprise several cooling stages.

In this variant, the process of the invention typically comprises:

(1) Performing a first thermal treatment of carbonaceous material, at a temperature $T_1$ of between 50 and 90° C., such as between 50° C. and 75° C., thereby providing thermally treated carbonaceous material, (2) a) Cooling the resulting thermally treated carbonaceous material downstream of step (1) to an intermediate temperature $T_{2a}$ ($T_{2a}$ lower than $T_1$) of between 50° C. and 80° C. in a cooling unit (flash cooler) operating under vacuum (operating typically from 0.15 to 0.48 bar (absolute pressure, i.e. 15 000 to 48 000 Pa), thereby producing intermediate cooled carbonaceous material, (2) b) Cooling the intermediate cooled carbonaceous material downstream step 2a) to a final temperature $T_{2b}$ ($T_{2b}$ lower than $T_{2a}$) of between 34° C. and 47° C. in a cooling unit (flash cooler) operating under vacuum (operating typically from 0.05 to 0.1 bar, (absolute pressure), i.e. 5 000 to 10 000 Pa), and for example from 0.055 to 0.17 bar (absolute pressure), i.e. 5 500 to 17 000 Pa), thereby producing cooled carbonaceous material, (3) Performing a post-treatment of the cooled carbonaceous material.

The cooling temperature $T_{2a}$ of step (2a) is, in an embodiment, around 50° C. when step (1) is performed at 55-60° C., around 65° C. when step (1) is performed at 70-75° C. and around 80° C. when step (1) is performed at 85° C.-90° C.

In this variant, step (1) is, in an embodiment, a pasteurization step. In such case, the post treatment is, in an embodiment, an anaerobic treatment, such as a fermentation or an anaerobic digestion. The anaerobic digestion may be a two-stage digestion or a mesophilic digestion.

In a particular embodiment, the process according to the invention comprises the steps of (1) Performing a first thermophilic biological treatment of wastewater sludge or organic matter or any carbonaceous material, at a temperature between 50 and 75° C., (2) Cooling the resulting hydrolysed sludge or organic matter or carbonaceous material downstream of the first stage from 50-75° C. to 35-42° C. in a flash cooler operating under vacuum (operating typically from 0.05 to 0.1 bar (absolute pressure, i.e. 5,000 to 10,000 Pa), such as from 0.055 to 0.17 bar, thereby producing cooled sludge, (3) Performing a post-treatment of the cooled sludge.

When the post-treatment of the resulting hydrolysed cooled carbonaceous material such as sludge (i.e. carbonaceous material produced in step (2) is a mesophilic digestion step, it is beneficially performed in a second reactor at 35-42° C.

Recovered steam produced in step (2), at low pressure and low temperature, may be condensed in other unit operations.

In a second aspect, the present invention is directed towards an installation to implement the process and a flash cooling unit designed for implementation of the process.

The new installation is constructed and arranged so that:
The viscosity of the carbonaceous material (notably sludge) has no influence on the design of the system,
Grit settling has no influence on the design of the system,
The temperature of the raw carbonaceous material (notably sludge) has no influence on the design of the system,
the head loss generated is insignificant compared to a heat exchanger,
Maintenance is significantly reduced.

An aspect of the invention thus relates to an installation comprising:
at least a thermal treatment unit (1) for thermally treating carbonaceous material,
at least a vacuum cooling unit (2) downstream the thermal treatment unit for cooling the carbonaceous material, and
at least a post-treatment unit, downstream the vacuum cooling unit (2), for post-treating the cooled carbonaceous material, and
at least one degassing tank (DT) installed upstream the vacuum cooling unit (2).

Beneficially, the installation comprises at least one carbon dioxide scrubbing unit (CO2S), upstream of the vacuum cooling unit (2).

In an embodiment, an installation according to the invention comprises:
A first unit with one or multiple reactor(s) wherein a thermal treatment like thermophilic biological treatment of sludge/organic matter is performed between 50-90° C., such as 50-75° C. This unit can be segmented in multiple subunits in series or operated as one tank.
A vacuum cooling unit downstream the first thermal treatment unit(s),
A second or multiple unit(s) for post-treatment downstream the vacuum cooling unit.

The installation may thus comprise:
a thermal treatment unit for thermally treating carbonaceous material at a temperature of between 50-90° C., such as 50-75° C., having a first inlet $I_1$ and a first outlet $O_1$, the thermal treatment unit being configured to be fed at the first inlet $I_1$ with carbonaceous material, and to produce a thermally treated carbonaceous material, recovered at the first outlet $O_1$,
a vacuum cooling unit having a first inlet $I_2$ and a first outlet $O_2$, and optionally a second outlet $O_{2'}$, the first inlet $I_2$ being in fluid connection with the first outlet $O_1$ of the thermal treatment unit, the vacuum cooling unit being configured to be fed at the first inlet $I_2$ with the thermally treated carbonaceous material, and to produce cooled carbonaceous material recovered at the first outlet $O_2$, and optionally recovered steam at the second outlet $O_{2'}$,
a post-treatment unit, having a first inlet $I_3$ and a first outlet $O_3$, the first inlet $I_3$ being in fluid connection with the first outlet $O_2$ of the vacuum cooling unit, the post-treatment unit being configured to be fed at the first inlet $I_3$ with the cooled carbonaceous material, and to produce post-treated carbonaceous material recovered at the first outlet $O_3$.

As used herein, a "thermal treatment unit" is understood as a unit suitable for performing a thermal treatment of carbonaceous material at a temperature of between 50-90° C., such as 50-75° C. The thermal treatment unit may be a TH unit, a BH unit, a thermophilic anaerobic digester, or a pasteurization unit.

As used herein, a "vacuum cooling unit" is understood as a unit suitable for performing evaporation under vacuum, that is to say at a pressure below atmospheric pressure, typically operating at an absolute pressure ranging from 0.055 to 0.480 bar (i.e. 5 500 to 48 000 Pa), such as from 0.055 to 0.170 bar (i.e. 5 500 to 17 000 Pa), or from 0.15 to 0.48 bar (i.e. 15 000 to 48 000 Pa).

As used herein, a "unit for post-treatment" or a "post-treatment unit" is understood as a unit suitable for performing a further biological treatment or a mechanical treatment. In an embodiment, the post-treatment step comprises a further biological treatment, in particular a mesophilic digestion step.

Beneficially, the installation further includes a heat recovery vessel downstream the vacuum cooling unit. In other words, the installation beneficially further comprises:
a heat recovery vessel, having a first inlet $I_4$, a first outlet $O_4$, and a second outlet $O_{4'}$, the first inlet $I_4$ being in fluid connection with the second outlet $O_{2'}$ of the vacuum cooling unit, the heat recovery vessel being configured to be fed at the first inlet I4 with the recovered steam, the recovered steam being then contacted with carbonaceous material (or fresh organic matter) into vessel, to produce pre-heated carbonaceous material recovered at the first outlet $O_4$, and further recovered steam recovered at the second outlet. Beneficially, the outlet $O_4$ of the heat recovery vessel is in fluid connection with inlet. Alternatively, the thermal treatment unit comprises a second inlet $I_{1'}$, and the outlet $O_4$ of the heat recovery vessel is in fluid connection with inlet $I_{1'}$, the thermal treatment unit being configured to be fed with the pre-heated carbonaceous material.

Beneficially, the installation further comprises a heat recovery vessel upstream of the thermal treatment unit for contacting the carbonaceous material with the recovered steam.

Beneficially, the installation further comprises a condenser having a first inlet $I_{Hex}$, a first outlet $O_{Hex}$, and a second outlet $O_{Hex'}$ (not shown), the first inlet $I_{Hex}$ being in fluid connection with the second outlet $O_{4'}$ of the heat recovery vessel, the condenser being configured to be fed at the first inlet $I_{Hex}$ with the recovered steam, and to produce off-gas recovered at the first outlet $O_{Hex}$, and condensed liquid (generally process water) recovered at the second outlet $O_{Hex'}$. The condenser is, in an embodiment, a direct or indirect heat exchanger.

Beneficially, the installation further comprises at least one carbon dioxide scrubbing unit (CO2S) connected to the heat recovery vessel (4,4b).

Beneficially, the degassing tank (DT) is installed upstream the vessel (4) and/or between the thermal treatment unit (1) and the vacuum cooling unit (2).

Beneficially, the vacuum cooling unit (2) comprises a booster centrifugal fan and a vacuum pump.

Beneficially, each line of the installation comprises an independent vacuum pump.

In a variant, the installation further comprises a second heat recovery vessel downstream the first heat recovery vessel and upstream the thermal treatment unit.

In a particular embodiment, the first unit or thermal treatment unit is a reactor suitable for thermophilic digestion. In this variant, the second unit or post-treatment unit is a reactor suitable for mesophilic digestion.

In a particular embodiment, the vacuum cooling unit comprises two vacuum cooling units installed in series. In other words, the vacuum cooling unit is a two-stage vacuum cooling unit. In this embodiment, the treated carbonaceous material is directed from the thermal treatment unit to a first cooling unit, then the cooled carbonaceous material from the first cooling unit is further cooled in a second cooling unit and directed towards the post-treatment unit.

In this embodiment, the installation thus comprises:
a thermal treatment unit for thermally treating carbonaceous material at a temperature of between 50-90° C., such as 50-75° C., having a first inlet $I_1$ and a first outlet $O_1$, the thermal treatment unit being configured to be fed at the first inlet $I_1$ with carbonaceous material, and to produce a thermally treated carbonaceous material, recovered at the first outlet $O_1$,
a first vacuum cooling unit having a first inlet $I_{2a}$ and a first outlet $O_{2a}$, and optionally a second outlet $O_{2a'}$, the first inlet $I_{2a}$ being in fluid connection with the first outlet $O_1$ of the thermal treatment unit, the first vacuum cooling unit being configured to be fed at the first inlet $I_{2a}$ with the thermally treated carbonaceous material, and to produce intermediate cooled carbonaceous material recovered at the first outlet $O_{2a}$, and optionally recovered steam at the second outlet $O_{2a'}$,
a second vacuum cooling unit having a first inlet $I_{2b}$ and a first outlet $O_{2b}$, and optionally a second outlet $O_{2b'}$, the first inlet $I_{2b}$ being in fluid connection with the first outlet $O_{2a}$ of the first vacuum cooling unit, the second vacuum cooling unit being configured to be fed at the first inlet I2b with the intermediate cooled carbonaceous material and to produce cooled carbonaceous material recovered at the first outlet $O_{2b}$, and optionally recovered steam at the second outlet $O_{2b'}$, and
a post-treatment unit, having a first inlet $I_3$ and a first outlet $O_3$, the first inlet $I_{pt}$ being in fluid connection with the first outlet $O_{2b}$ of the second vacuum cooling unit, the post-treatment unit being configured to be fed at the first inlet $I_3$ with the cooled carbonaceous material, and to produce post-treated carbonaceous material recovered at the first outlet $O_3$.

In this embodiment, the recovered steam produced in the first and second cooling units is condensed in one or several condensers. The condenser may be a direct or indirect heat exchanger Hex (more specifically a water/steam heat exchanger Hex).

A "heat exchanger" is known in the art: it is a system used to transfer heat between two or more fluids (at least one cool fluid and one hot fluid), which may be used in both cooling and heating processes. The fluids may be separated by a solid wall to prevent mixing (indirect heat exchanger) or they may be in direct contact (direct heat exchanger). In various aspects of the invention, heat exchangers are used to cool down the recovered steam. The cool fluid is typically process water, while the hot fluid is steam.

The steam produced in the second cooling unit may be recovered and directed to a second heat recovery vessel wherein the steam is contacted with carbonaceous material (desirably fresh organic matter), thereby producing a first pre-heated carbonaceous material, the first pre-heated carbonaceous material being then sent to the second heat recovery unit, wherein the first pre-heated carbonaceous material is contacted with the recovered steam from the first cooling unit.

Beneficially, the steam produced in the first cooling unit is recovered and sent to a heat recovery vessel wherein the steam is contacted with carbonaceous material (desirably fresh organic matter).

In a particular embodiment, an installation according to the invention comprises:
- A first unit with one or multiple sub-units (reactor) wherein a thermal treatment like thermophilic biological treatment of sludge/organic matter is performed between 50-90° C., such as 50-75° C. This unit can be segmented in multiple subunits (reactors) in series or operated as one tank (reactor).
- A vacuum cooling unit downstream the first thermal unit,
- A second unit in one or multiple sub-units for post-treatment downstream the vacuum cooling unit.

An installation according to an aspect of the invention may also include:
- A holding tank containing (fresh primary, mixed or biological sludge/organic matter or any carbonaceous matter to be treated) ahead of the first reactor. As an alternative, the readily degradable organic matter (carbonaceous material) can be sent directly to the post-treatment unit while the sludge is first processed in the first reactor.
- A heat exchanger on both the first unit and the second unit (or solely on the first thermal treatment unit) to maintain the carbonaceous material temperature at the required set point.

BRIEF DESCRIPTION OF THE DRAWINGS

The present invention is illustrated more in details in the following figures wherein:

FIG. 1 illustrates a hydrolysis pre-treatment implemented upstream a mesophilic digester of wastewater sludge of the state of the art;

FIG. 2 illustrates state of the art temperature phased anaerobic digestion (TPAD) process of wastewater sludge;

FIG. 3 illustrates an installation to perform a temperature phased anaerobic digestion (TPAD) process of wastewater sludge according to an embodiment of the invention;

FIG. 4 represents an installation for implementing a process of wastewater sludge treatment according to an embodiment of the invention;

FIG. 5 represents an installation for implementing a process of wastewater sludge treatment according to an embodiment of the invention;

FIG. 6 represents an installation for implementing a process of wastewater sludge treatment according to an embodiment of the invention;

FIG. 7 represents an installation for implementing a process of wastewater sludge treatment according to an embodiment of the invention;

FIG. 8 represents an installation for implementing a process of wastewater sludge treatment according to an embodiment of the invention, and FIG. 9 represents an installation for implementing a process of wastewater sludge treatment according to an embodiment of the invention.

DETAILED DESCRIPTION

According to one or more aspects of the invention, the process is performed in an installation that comprises a first reactor 1 wherein a thermal treatment takes place to treat municipal sludge, organic matter or any carbonaceous material from a holding tank 1a. The hot organic matter is then cooled in a vacuum cooling unit 2 downstream the thermal reactor 1 before entering into a second reactor 3 wherein the cooled organic matter can be treated by a post-treatment like anaerobic digestion.

In other words, the installation of FIG. 3 comprising:
- at least a thermal treatment unit (1) for thermally treating carbonaceous material at a temperature of between 50-90° C., such as 50-75° C.,
- at least a vacuum cooling unit (2) downstream the thermal treatment unit for cooling the carbonaceous material, and
- at least a post-treatment unit (3), downstream the vacuum cooling unit (2), for post-treating the cooled carbonaceous material.

More specifically, the installation of FIG. 3 comprises:
- a thermal treatment unit (1) for thermally treating carbonaceous material at a temperature of between 50-90° C., such as 50-75° C., having a first inlet $I_1$ and a first outlet $O_1$, the thermal treatment unit being configured to be fed at the first inlet $I_1$ with carbonaceous material, and to produce a thermally treated carbonaceous material (TL2), recovered at the first outlet $O_1$,
- a vacuum cooling unit (2) having a first inlet $I_2$ and a first outlet $O_2$, and optionally a second outlet $O_{2'}$, the first inlet $I_2$ being in fluid connection with the first outlet $O_1$ of the thermal treatment unit, the vacuum cooling unit (2) being configured to be fed at the first inlet $I_2$ with the thermally treated carbonaceous material (TL2), and to produce cooled carbonaceous material (TL3) recovered at the first outlet $O_2$, and optionally recovered steam (SL1) at the second outlet $O_{2'}$,
- a post-treatment unit (3), having a first inlet $I_3$ and a first outlet $O_3$, the first inlet $I_3$ being in fluid connection with the first outlet $O_2$ of the vacuum cooling unit (2), the post-treatment unit (3) being configured to be fed at the first inlet $I_3$ with the cooled carbonaceous material (TL3), and to produce post-treated carbonaceous material recovered at the first outlet $O_3$.

In a variant of the first embodiment, the produced steam in the cooling step is put in contact by a stream line SL1 with the raw sludge in a reactor 4 placed upstream the reactor 1 of the first unit (see FIG. 3). The contact can be done using a counter current direct contact tower or any other means in a way to have a limited heat loss of the steam while maintaining a maximum contact between the raw sludge and the steam to maximise condensation. As an alternative, the produced steam of vacuum cooling step (2) produced in the unit 2 may be sent back (SL2) to the reactor 1 to pre-heat the latter (direct injection in the reactor 1).

The biogas produced in reactors 1, 3 of the first and second units may be sent respectively by a biogas line BL3, BL4 to a biogas recovery unit 5, typically a CHP (Combined Heat and Power) unit. Heat may be recovered from the biogas recovery unit 5 and sent to reactor 1 by a heat line HL.

As another alternative, a heat exchanger HEx can be used on the produced steam to heat up the raw (primary, mixed or biological) sludge (less desired).

If it is uneconomical to inject the entire flowrate of steam into the reactor 1 of the first unit, or the holding tank 1a, or the heat exchanger, part of the steam can be condensed in a condenser while the rest is sent to pre-heat the incoming sludge (see FIG. 4).

The installation of FIG. 4 further comprises:
a heat recovery vessel (4), having a first inlet $I_4$, a first outlet $O_4$, and a second outlet $O_{4'}$, the first inlet $I_4$ being in fluid connection with the second outlet $O_{2'}$ of the vacuum cooling unit (2), the heat recovery vessel (4) being configured to be fed at the first inlet $I_4$ with the recovered steam (SL1), the recovered steam (SL1) being then contacted with carbonaceous material (or fresh organic matter) (TL1) into vessel (4), to produce pre-heated carbonaceous material (TL1') recovered at the first outlet $O_4$, and further recovered steam SL3 recovered at the second outlet $O_{4'}$. Beneficially, the outlet $O_4$ of the heat recovery vessel (4) is in fluid connection with inlet $I_1$. Alternatively, the thermal treatment unit (1) comprises a second inlet $I_{1'}$, and the outlet $O_4$ of the heat recovery vessel (4) is in fluid connection with inlet $I_{1'}$, the thermal treatment unit (1) being configured to be fed with the pre-heated carbonaceous material (TL1').

Beneficially, the installation of FIG. 4 further comprises a condenser Hex having a first inlet $I_{Hex}$, a first outlet $O_{Hex}$, and a second outlet $O_{Hex'}$ (not shown), the first inlet $I_{Hex}$ being in fluid connection with the second outlet $O_{4'}$ of the heat recovery vessel (4), the condenser Hex being configured to be fed at the first inlet $I_{Hex}$ with the recovered steam SL3, and to produce off-gas recovered at the first outlet $O_{Hex}$, and condensed liquid (generally process water) recovered at the second outlet $O_{Hex'}$. In an embodiment, the condenser is a direct or indirect heat exchanger.

This reinjection of low pressure and temperature recovered steam enables the carbonaceous material (depending on step 1, it may be primary, mixed or biological sludge), to be heated up from a temperature of 10 to 20° C. to a temperature of 20 to 45° C. (typically between 30° C. and 40° C., for instance between 30° C. and 35° C.), thus leading to global energy saving in the process. The recovered steam from step (2) is at a pressure between 0.055 to 0.480 bar (absolute pressure), i.e. 5 500 to 48 000 Pa). Thanks to a vacuum pump (i.e. a diaphragm vacuum pump) placed downstream the cooling unit (flash cooler), the recovered flash steam may be put in contact with the carbonaceous material (which may be primary/mixed/biological sludge). Due to the low solid content of the sludge (between 3 and 25% mass %, in particular between 3 and 8 mass %), such contact is possible without any further intermediate device.

As illustrated in FIG. 4, in a variant of the embodiment, the process comprises the steps of:
(1a) contacting the wastewater sludge or organic matter or any carbonaceous material issued from the storage tank 1a in a heat recovery vessel 4 with the recovered steam SL1 from a cooling step (2) downstream the reactor 1 of the first unit wherein is performed a thermal treatment either a thermophilic biological treatment of sludge/organic matter/carbonaceous material is performed between 50 and 90° C., such as between 50° C. and 75° C. or a mechanical treatment of sludge/organic matter (carbonaceous material);
(1) submitting the sludge/organic matter/carbonaceous material pre-heated in the previous step to a thermal treatment, e.g. a thermophilic biological treatment between 50-90° C. in the reactor 1 of the first unit;
(2) cooling the resulting sludge or organic matter or carbonaceous material downstream the first unit from 50-90° C. to 35-42° C. in a vacuum cooling unit 2 operating under vacuum (vacuum pump VP) (operating typically from 0.05 to 0.1 bar (absolute pressure), i.e. 5000 to 10 000 Pa), such as 0.055 to 0.17 bar thereby producing cooled carbonaceous material;
(3) performing a post-treatment of the cooled sludge/organic matter/carbonaceous material in a reactor 3 of the second unit.

The recovered steam (SL1) from cooling unit 2 is sent to a heat recovery vessel 4. As a result, recovered steam (SL1) is at least partly condensed in vessel 4. Off-gas (SL2) is sent to a vacuum pump to be evacuated from the installation or further treated.

The embodiment is illustrated in FIGS. 4 and 5.

If in heat recovery vessel 4, the contact between the carbonaceous material (more specifically fresh sludge) and the recovered steam is a direct one, then a foam abatement step, as for example a mechanical foam abatement like recirculation of the sludge in the vessel or a chemical foam abatement like anti-foaming product injection may be performed.

In another embodiment (not shown), a first part of the recovered steam SL1 is beneficially sent back to reactor 1 of the thermal treatment unit to pre-heat the latter (direct injection in reactor 1) and a second part (SL2) is sent to the heat recovery vessel 4 to heat the fresh sludge (see FIG. 4).

In FIG. 5, is illustrated a step of vacuum cooling with a minimum number of subunits/elements. This kind of installation can then present a minimal size with a minimal pre-heating step. The cooling step is made in one step so the steam temperature will be equal to the sludge temperature in the vacuum cooler, which is the lowest achievable temperature with this system.

The carbonaceous material is directed in the treatment line TL1 into the recovery heat vessel 4 to be contacted with steam. The pre-heated carbonaceous material may be optionally then hold in a holding tank 1b. The carbonaceous material is directed towards the reactor 1 of the first unit through the treatment line TL1" to be thermally or mechanically treated. The non-condensable products may be processed in a further treatment step(s) such as an odour treatment unit.

The hot carbonaceous material is directed from the reactor 1 of the first unit through TL2 to the vacuum cooling unit 2. Then the cooled matter is sent by TL3 into the reactor 3 of the second unit that may be an anaerobic digestion tank 3. The steam recovered from the cooling unit 2 is directed by SL1 into the heat recovery unit vessel 4 to perform the pre-heating of the raw carbonaceous material.

The steam in excess in the vessel 4 may be directed by SL3 to a condenser HEx and the non-condensable products may be sent by a non-condensable line to a biogas recovery or to a further treatment step. The condenser Hex can be a direct one or indirect condenser like a contactor.

In FIG. 6, the illustrated installation proposes a two-substeps vacuum cooling units with a maximal heat recovery in the case of limited availability of cooling fluid (such as process water).

Consequently, the installation provides two cooling units 2a, 2b installed in series.

The organic matter treated in the first reactor 1 is cooled in a first cooling unit 2a and then in a second cooling unit 2b. The steam produced in the second cooling unit 2b is recovered and sent (SL1b) to a heat recovery vessel 4b wherein the steam is contacted with fresh organic matter. The pre-heated organic matter is then sent by TL1' to a second heat recovery unit 4a wherein the first pre-heated organic matter is contacted with the recovered steam (SL1a) from the first cooling unit 2a. Consequently, the organic matter is first pre-heated by the coldest recovered steam and then by the hottest recovered steam. These two steps of pre-heating the organic matter allows the improvement of the rheological properties of the organic matter as the organic matter is diluted and pre-heated before the second step of pre-heating.

That avoids the need of cooling water to condensate the produced steam in the second sub-step of vacuum cooling, the steam being condensed in the organic matter. The condenser may be optional as the steam can all be consumed in the preheating step, avoiding the need for water and also for a condenser.

In that example of installation, the recovered steam (SL3a, SL3b) produced by the two vacuum cooling units may be condensed in condenser HEx. In the figures two condensers HEx are represented but the condensation may be performed in one condenser. The condenser Hex may be a direct or indirect condenser, such as a contactor. All the non-condensable matters may then be treated in subsequent treatment steps such odour treatment line, or evacuated in the atmosphere or joined to the produced biogas in the post-treatment.

The installation of FIG. 6 comprises:
  a thermal treatment unit for thermally treating carbonaceous material at a temperature of between 50-90° C., such as 50-75° C., having a first inlet $I_1$ and a first outlet $O_1$, the thermal treatment unit being configured to be fed at the first inlet $I_1$ with carbonaceous material, and to produce a thermally treated carbonaceous material (TL2), recovered at the first outlet $O_1$,
  a first vacuum cooling unit (2a) having a first inlet $I_{2a}$ and a first outlet $O_{2a}$, and optionally a second outlet $O2_{a'}$, the first inlet $I_{2a}$ being in fluid connection with the first outlet $O_u$ of the thermal treatment unit, the first vacuum cooling unit (2a) being configured to be fed at the first inlet $I_{2a}$ with the thermally treated carbonaceous material (TL2), and to produce intermediate cooled carbonaceous material (TL2') recovered at the first outlet $O_{2a}$, and optionally recovered steam (SL1a) at the second outlet $O_{2a'}$,
  a second vacuum cooling unit (2b) having a first inlet $I_{2b}$ and a first outlet $O_{2b}$, and optionally a second outlet $O2_{b'}$, the first inlet $I_{2b}$ being in fluid connection with the first outlet $O_{2a}$ of the first vacuum cooling unit, the second vacuum cooling unit (2b) being configured to be fed at the first inlet $I_{2b}$ with the intermediate cooled carbonaceous material (TL2'), and to produce cooled carbonaceous material (TL3) recovered at the first outlet $O_{2b}$, and optionally recovered steam (SL3b) at the second outlet $O_{2b'}$, and
  a post-treatment unit (3), having a first inlet $I_3$ and a first outlet $O_3$, the first inlet $I_3$ being in fluid connection with the first outlet $O_{2b}$ of the second vacuum cooling unit, the post-treatment unit (3) being configured to be fed at the first inlet $I_3$ with the cooled carbonaceous material, and to produce post-treated carbonaceous material recovered at the first outlet $O_3$.

In this embodiment, the recovered steam produced in the first and second cooling units (SL3a and SL3b) is condensed in one or several condensers. The condenser may be a direct or indirect heat exchanger Hex (more specifically a water/steam heat exchanger Hex).

The steam produced in the second cooling unit (2b) may be recovered and directed to the heat recovery vessel (4b) wherein the steam is contacted with carbonaceous material (desirably fresh organic matter), thereby producing a first pre-heated carbonaceous material, the first pre-heated carbonaceous material being then sent to the second heat recovery unit (4a), wherein the first pre-heated carbonaceous material is contacted with the recovered steam (SL1a) from the first cooling unit (2a).

Beneficially, the steam produced in the first cooling unit (2a) is recovered and sent to a heat recovery vessel (4) wherein the steam is contacted with carbonaceous material (such as fresh organic matter).

The process allows a maximal energy recovery with very viscous flow of dry organic matter, highly concentrated in dry matter and/or an installation wherein cooling water availability is limited.

In FIG. 7, the illustrated installation provides an equilibrium between optimising heat recovery and minimising the number of subunits/elements of the installation. This installation can be considered when the cooling water is available, and the organic matter flow is easy to pre-heat.

Consequently, the installation provides also two vacuum cooling units 2a, 2b installed in series but the treated organic matter issued from the reactor 1 is cooled by the first cooling unit 2a and the recovered steam (SL1a) from this unit 2a is used in a heat recovery vessel 4 to pre-heat the organic matter before the reactor 1.

The cooled organic matter is then cooled a second time in the cooling unit 2b before to be directed TL3 towards the second reactor 3 for post-treatment.

The excess steam produced in the first and second cooling units is condensed SL3a and SL3b in a condenser like a water/steam heat exchanger HEx, that can be direct or indirect heat exchanger. The condenser Hex may be a direct or indirect condenser, such as a contactor. This installation provides an optimal balance cost/energy gain even if cooling water is needed.

Embodiment of FIG. 8

The production of non-condensable gases varies between 50 and 1000 NL/m$^3$ of sludge and typically between 100 L-500 NL/m$^3$ of sludge, depending among other things on the type of sludge, its rheological properties, its concentration, and the heat treatment applied (Step 1).

Consequently, the vacuum pumps necessary for the treatment of carbonaceous materiel should be powerful enough to reach a vacuum allowing the pumping of non-condensable gases (m$^3$/h instead of Nm$^3$/h). Because of these gases, the pumps should be therefore more powerful and more energy consuming than necessary.

In order to overcome this problem, in an optimized embodiment, the previously described process of treatment of carbonaceous material, comprises in addition at least one step of carbonaceous material (sludge for example) degassing.

The degassing step(s) operate(s) at a vacuum level higher than the corresponding boiling point of the hot (from thermal treatment) and fresh sludge.

The degassing step(s) allow(s) for the removal of the non-condensable gases from the hot (from thermal treatment) and fresh sludge without producing steam and therefore without cooling the hot sludge.

In this embodiment, the installation for implementing the process according to the invention, comprises at least one degassing tank (DT) installed upstream (in series):
- of cooler 1 (2a); and/or
- on condenser 2 (4b)

The degassing tank(s) operate(s) at a vacuum level higher than the corresponding boiling point of the hot (from thermal treatment) and fresh sludge The degassing tank(s) allow(s) for the removal of the non-condensable gases from the hot (from thermal treatment) and fresh sludge without producing steam and therefore without cooling the hot sludge. These degassing tanks can be connected to their own dedicated vacuum pump(s), share the same vacuum pump or be connected to the vacuum pump of the rest of the heat recovery unit. In the latter, the vacuum level is regulated with a valve between headspace of the degassing tank(s) and the rest of the installation.

Consequently, the vacuum pump flowrate will be reduced (by considering a heat recovery unit operating at 66 mbar).

When a degassing tank operating at 500 mbar is installed, the vacuum pump will have to displace $Q2=Q1/(500+66)*66=Q1/8.6$. this significantly reduces the size of the pump. Typically, the degassing tank will operate between 200 and 800 mbar, which allows for a 4 to 13-fold vacuum pump size reduction.

A degassing tank on cooler 1 (2a) would have the most impact. Indeed, the sludge entering cooler 1 represents ca. 70% of the non-condensable gas (by volume) released in the system.

According to an example of realization (FIG. 8), the degassing tank is located upstream the vessel 4 (heat recovery vessel wherein the carbonaceous material is in contact with the recovered steam produced by the vacuum cooling step).

According to an example of realization (FIG. 8), the degassing tank is located between the thermal treatment unit (1) and the vacuum cooling unit (2).

According to an example of realization (FIG. 8), a first degassing tank is located upstream the vessel 4, and a second degassing tank is located between the thermal treatment unit (1) and the vacuum cooling unit (2).

First Optimized Embodiment (FIG. 9)

According to an embodiment, the process of treatment of carbonaceous material, comprises a step of $CO_2$ capturing upstream of the step of cooling of the thermally treated carbonaceous material.

Indeed, as $CO_2$ represents up to 75% of the non-condensable gas fraction, by removing $CO_2$ upstream of the vacuum pump, this reduces the load on the vacuum pump itself.

According to an example of implementation, this step is performed to capture $CO_2$ into the steam in excess in the vessel 4 (heat recovery vessel wherein the carbonaceous material is in contact with the recovered steam produced by the vacuum cooling step), such as after the step of condensing (HEx) and before the vacuum pump (VP).

In this optimized embodiment, the installation for implementing the process according to the invention, comprises at least one scrubbing unit of the $CO_2$ (CO2S), upstream of the vacuum cooling unit (2). A carbon dioxide scrubber is a piece of equipment that absorbs carbon dioxide ($CO_2$).

In an embodiment, the carbon dioxide scrubber is connected to the heat recovery vessel (4), or to each recovery vessel (4,4b).

In an embodiment, the carbon dioxide scrubber is located between the heat exchangers (HEx) and the vacuum pump (VP) (see FIG. 9).

According to an example of implementation, one can use a chemical carbon dioxide scrubber.

In FIG. 9, is illustrated a step of vacuum cooling with a minimum number of subunits/elements as illustrated on FIG. 5. The installation of FIG. 9 comprises a scrubbing unit of the $CO_2$ (CO2S) between the heat exchangers (HEx) and the vacuum pump (VP).

Second Optimized Embodiment (Not Illustrated)

According to an embodiment, the installation comprises a first and a second cooling units (SL3a and SL3b), as the installation illustrated in FIG. 6 and FIG. 7. The recovered steams produced in the first and second cooling units (SL3a and SL3b) are condensed in a first and a second condenser respectively. The condenser may be a direct or indirect heat exchanger Hex (more specifically a water/steam heat exchanger Hex).

But in this embodiment, the first and a second condenser are connected to a same vacuum pump (VP).

According to this embodiment, the vacuum cooling unit (2) comprises a combination of a booster centrifugal fan and a vacuum pump smaller than the vacuum pump of previous embodiments. The booster allows for an increase in the absolute pressure of ca. 100 mbar. Consequently, the flowrate of vapour being displaced by the vacuum pump will be reduced accordingly.

Example considering a flowrate Q1 at 66 mbar: when a booster fan is installed, the vacuum pump will have to displace $Q2=Q1/(100+66)*66=Q1/2.5$. This significantly reduces the size of the pump.

Third Optimized Embodiment (Not Illustrated)

According to an embodiment, each line of the installation is operated with a vacuum pump, independently.

Thus, in this embodiment, each line of the installation comprises an independent vacuum pump. According to an example, the installation comprises:
- a first vacuum pump for the line Cooler 1, Condenser 1 and Final condenser 1;
- a second vacuum pump for the line Cooler 2, Condenser 2 and Final condenser 2.

BENEFITS OF THE INVENTION

Cooling using a vacuum cooling system compared to a conventional heat exchanger operating with process water has many beneficial effects:
- Cooling efficiency does not depend on the process water temperature but on the vacuum pressure, which is much easier to control. Cooling is nearly instantaneous and does not require a significant HRT (Hydraulic Retention Time) as in a HEx.
- Viscosity variation of the sludge is no longer an issue.
- In the absence of a HEx, there is no need for maintenance on sludge transfer pumps & pipes.
- TPAD/2PAD processes according to an embodiment of the invention can be implemented on large industrial installations, where the HEx size issues would become unmanageable with state-of-the-art processes.
- When operated in batch configuration (2PAD), the flash cooling allows for a significant reduction in the sludge withdrawal sequence from the thermophilic reactor. Consequently, this increases the batch time, which reduces the size of the thermophilic reactor heating HEx and/or the feeding pumps (feeding can occur for a longer period).

Raw sludge pre-heating based on direct steam injection of the off-gas produce by the flash under vacuum pressure, into the raw sludge has the following benefits over conventional heat-exchanger based pre-treatment in know TPAD/2PAD.

Heat recovery is independent from the sludge viscosity.

The off-gas generated by a vacuum cooling system can be problematic (odour issue due to the presence of $H_2S$ and $NH_3$). Usually, this issue is dealt with by injecting this gas into the digester once it is condensed. Reusing this off gas without condensing it to preheat the raw sludge, allows to treat it according to standard processes, via the plant odour treatment unit 6. In the present application, the low temperature steam reduces the quantity of odours and contaminants (organic material vaporised) compared to conventional flash systems.

In the absence of a HEx, there is no need for maintenance on sludge transfer pumps and pipes.

In the field of anaerobic digestion of sludge, vacuum cooling is usually linked with cooling high temperature sludge (around 165° C.) that is treated with a THP or with other thermal treatments, down to a temperature of around 100° C. The pressure following such a flash (in the field of sludge treatment) remains higher than atmospheric pressure (delta P of the flash>atmospheric pressure).

Secondary vacuum cooling may be used to cool sludge from a temperature between 100 to 110° C. down to a temperature around 60° C. (the term "around" covering variations of +/−10%). The secondary flash might operate under vacuum.

The last cooling step, in order to cool the sludge down to a temperature of 37-38° C. appropriate for Anaerobic digestion (mesophilic step), is performed by diluting the sludge with process water or mixing it with raw primary sludge produced by primary settling tanks Using vacuum cooling to reduce the temperature of the sludge under the 60° C. threshold was never described in the field of municipal sludge treatment.

In state-of-the-art processes, the non-condensable gas generated during the flash cooling step(s) following steam cooling and condensation to 37° C.-38° C., is fed into the mesophilic reactor.

At last, the use of:
- at least one step of carbonaceous material degassing (with at least one degassing tank (DT) installed upstream the vacuum cooling unit); and/or
- at least one step of removing $CO_2$ upstream of the vacuum pump (with at least one carbon dioxide scrubbing unit (CO2S); and/or
- a combination of at least one booster centrifugal fan; and/or
- independently operated vacuum pump for each line of the installation;

allows to reduce the load on the vacuum pump itself, and thus allow to decrease the size and the power-consumption of the vacuum pump.

It will be appreciated that the various embodiments described previously are combinable according to any technically permissible combinations.

The articles "a" and "an" may be employed in connection with various elements, components, processes or structures described herein. This is merely for convenience and to give a general sense of the processes or structures. Such a description includes "one or at least one" of the elements or components. Moreover, as used herein, the singular articles also include a description of a plurality of elements or components, unless it is apparent from a specific context that the plural is excluded.

The invention claimed is:

1. A process of treatment of carbonaceous material, comprising:
    performing a thermal treatment of said carbonaceous material, thereby providing thermally treated carbonaceous material,
    cooling said thermally treated carbonaceous material, thereby providing cooled carbonaceous material, the cooling being performed using a vacuum cooling step, and
    performing a post-treatment of said cooled carbonaceous material, and
    at least one step of carbonaceous material degassing;
    wherein the carbonaceous material degassing operates at a vacuum pressure level above a pressure at which steam is produced from the hot and fresh carbonaceous material.

2. The process of claim 1, comprising a step of $CO_2$ capturing, upstream of the cooling.

3. The process of claim 1, comprising a step of pre-heating of the carbonaceous material before performing the thermal treatment of the carbonaceous material, the step of pre-heating being performed by direct steam contact of a recovered steam produced by the vacuum cooling step with the carbonaceous material.

4. The process of claim 3, wherein the carbonaceous material is directed first to a heat recovery vessel wherein said carbonaceous material is in contact with the recovered steam produced by the vacuum cooling step.

5. The process of claim 3, further comprising performing a step of $CO_2$ capturing on a steam in excess in a heat recovery vessel.

6. The process of claim 1, wherein
    performing the thermal treatment includes performing a first thermal treatment of carbonaceous material, at a temperature T1 between 50 and 90° C., thereby producing the thermally treated carbonaceous material, and
    cooling said thermally treated carbonaceous material includes cooling said thermally treated carbonaceous material downstream of performing the first thermal treatment to a temperature T2 lower than T1 of between 34-75° C., in a cooling unit operating under vacuum, thereby producing the cooled carbonaceous material.

7. The process of claim 1, wherein the cooling is performed in one or several sub-steps.

8. The process of the claim 7, wherein the cooling comprises:
    cooling the resulting thermally treated carbonaceous material downstream of performing the thermal treatment to an intermediate temperature T2a lower than T1, of between 50° C. and 80° C. in a cooling unit operating under vacuum, thereby producing intermediate cooled carbonaceous material, and
    cooling said intermediate cooled carbonaceous material downstream of cooling the resulting thermally treated carbonaceous material downstream of performing the thermal treatment to a final temperature T2b lower than T2a of between 34° C. and 47° C. in a cooling unit operating under vacuum, thereby producing cooled carbonaceous material.

9. The process of claim 1, wherein the thermal treatment is a pasteurization, a thermophilic biological treatment, or a low temperature thermal hydrolysis.

10. The process of claim 1, wherein the post-treatment is:
a mechanical treatment step, or a temporary storage step, or
an anaerobic treatment step, an anaerobic digestion, or a mesophilic digestion step.

11. The process of claim 1, wherein the carbonaceous material is organic waste and/or sludge.

12. An installation for implementing the process of claim 1, comprising:
a thermal treatment unit for thermally treating carbonaceous material,
a vacuum cooling unit downstream the thermal treatment unit for cooling the carbonaceous material, and
a post-treatment unit, downstream the vacuum cooling unit, for post-treating the cooled carbonaceous material, and
a degassing tank installed upstream of the vacuum cooling unit;
said degassing tank being configured to operate at a vacuum pressure level above a pressure at which steam is produced from the hot and fresh carbonaceous material.

13. The installation of claim 12, comprising a carbon dioxide scrubbing unit, upstream of the vacuum cooling unit.

14. The installation of claim 12, comprising a first heat recovery vessel upstream of the thermal treatment unit for contacting the carbonaceous material with the recovered steam.

15. The installation of claim 14, comprising a carbon dioxide scrubbing unit connected to the first heat recovery vessel.

16. The installation of claim 14, wherein a degassing tank is installed upstream the first heat recovery vessel and/or between the thermal treatment unit and the vacuum cooling unit.

17. The installation of claim 14, further comprising a second heat recovery vessel downstream the first heat recovery vessel and upstream the thermal treatment unit.

18. The installation of claim 12, wherein the vacuum cooling unit comprises a booster centrifugal fan and a vacuum pump.

19. The installation of claim 12, wherein each line of the installation comprises an independent vacuum pump.

20. The installation of claim 12, wherein the vacuum cooling unit comprises two vacuum cooling units installed in series, the treated carbonaceous material from the thermal treatment unit by a treatment line being cooled in a first cooling unit of the two vacuum cooling units, then the cooled carbonaceous material being cooled in a second time in a second cooling unit of the two vacuum cooling units and directed through a treatment line towards the post-treatment unit for post-treatment.

21. The installation of claim 20, wherein a recovered steam produced in the first and second cooling units is condensed in one or more condensers.

22. The installation of claim 21, wherein the recovered steam produced in the second cooling unit is recoverable and directable to a heat recovery vessel wherein the steam is contacted with carbonaceous material, thereby producing a first pre-heated carbonaceous material, said first pre-heated carbonaceous material being then sent to another heat recovery unit, wherein the first pre-heated carbonaceous material is contacted with the recovered steam from the first cooling unit.

23. The installation of claim 20, wherein the recovered steam produced in the first cooling unit is recovered and sent to a heat recovery vessel wherein the steam is contacted with carbonaceous material.

24. The installation of claim 12, wherein the degassing tank is installed between the thermal treatment unit and the vacuum cooling unit.

25. The process of claim 1, wherein the degassing without production of steam removes non-condensable gases from the hot and fresh carbonaceous material.

26. The process of claim 25, wherein the degassing without production of steam avoids cooling of the hot and fresh carbonaceous material as the non-condensable gases are removed.

27. The process of claim 26, wherein at least one of the carbonaceous material degassing steps is performed after said thermal treatment and prior to said cooling.

28. The process of claim 1, wherein at least one of the carbonaceous material degassing steps is performed after said thermal treatment and prior to said cooling.

* * * * *